(12) United States Patent
Yamashita

(10) Patent No.: US 8,386,130 B2
(45) Date of Patent: Feb. 26, 2013

(54) OCCUPANT PROTECTION DEVICE

(75) Inventor: Toshiyuki Yamashita, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 702 days.

(21) Appl. No.: 12/521,678

(22) PCT Filed: Nov. 1, 2007

(86) PCT No.: PCT/JP2007/071328
§ 371 (c)(1),
(2), (4) Date: Jun. 29, 2009

(87) PCT Pub. No.: WO2008/096486
PCT Pub. Date: Aug. 14, 2008

(65) Prior Publication Data
US 2010/0318265 A1    Dec. 16, 2010

(30) Foreign Application Priority Data

Feb. 7, 2007  (JP) ................. 2007-028322

(51) Int. Cl.
*B60R 21/013*  (2006.01)
(52) U.S. Cl. .............. 701/45; 701/46; 701/47; 180/282; 340/436; 340/669
(58) Field of Classification Search .................. 701/45, 701/46, 47, 70, 301; 180/271, 282; 280/734, 280/735; 340/436, 669
See application file for complete search history.

(56) References Cited

U.S. PATENT DOCUMENTS

| | | | | |
|---|---|---|---|---|
| 5,424,583 A | * | 6/1995 | Spies et al. ................. 307/10.1 |
| 5,431,441 A | * | 7/1995 | Okano ........................ 280/735 |
| 5,440,485 A | * | 8/1995 | Okimoto et al. ............... 701/46 |
| 5,490,067 A | | 2/1996 | Teguri et al. |
| 5,555,174 A | * | 9/1996 | Okimoto et al. ............... 701/46 |
| 5,609,358 A | * | 3/1997 | Iyoda et al. .................. 280/735 |
| 5,742,506 A | * | 4/1998 | Kura et al. ................... 701/301 |
| 5,787,377 A | * | 7/1998 | Watanabe et al. .............. 701/45 |
| 5,936,518 A | * | 8/1999 | Fukui et al. .................. 340/436 |
| 6,038,495 A | * | 3/2000 | Schiffmann .................... 701/1 |
| 6,681,199 B2 | | 1/2004 | Imai et al. |
| 2002/0003345 A1 | * | 1/2002 | Stanley et al. ................ 280/735 |
| 2002/0152054 A1 | * | 10/2002 | Imai et al. .................... 702/189 |
| 2005/0080544 A1 | * | 4/2005 | Suzuki et al. ................. 701/70 |
| 2005/0171989 A1 | * | 8/2005 | Koyanagi ..................... 708/301 |
| 2008/0046147 A1 | * | 2/2008 | Cluff et al. ................... 701/45 |
| 2009/0118892 A1 | * | 5/2009 | Yamashita et al. ............. 701/29 |

FOREIGN PATENT DOCUMENTS

| | | | |
|---|---|---|---|
| DE | 4133316 | * | 4/1992 |
| DE | 42 18 483 | | 12/1992 |
| DE | 196 44 975 | | 5/1997 |

(Continued)

*Primary Examiner* — Thomas Black
*Assistant Examiner* — Ce Li
(74) *Attorney, Agent, or Firm* — Birch, Stewart, Kolasch & Birch, LLP

(57) ABSTRACT

The occupant protection device (air bag ECU 1) of the invention is composed of an input signal acquisition unit 11 for acquiring acceleration signals or angular velocity signals from sensors installed in a vehicle, a digital signal processing unit 12 for generating an output signal in a time series of the acceleration signals or angular velocity signals composed of consecutive first, second and third intervals by changing a multiplication factor of the second interval in comparison with the first and third intervals, a status determination unit 13 for determining a collision or rollover of the vehicle based on the output signal, and an air bag actuation circuit 14 for igniting a squib 32.

20 Claims, 12 Drawing Sheets

FOREIGN PATENT DOCUMENTS

| | | |
|---|---|---|
| DE | 101 10 168 | 8/2002 |
| JP | 4-146847 A | 5/1992 |
| JP | 5-286407 A | 11/1993 |
| JP | 6-316245 A | 11/1994 |
| JP | 7-144602 A | 6/1995 |
| JP | 7-291089 A | 11/1995 |
| JP | 9-315261 A | 12/1997 |
| JP | 2005-191895 * | 7/2005 |
| JP | 2005-191895 A | 7/2005 |
| WO | WO-2004/036746 A1 | 4/2004 |

* cited by examiner (a)

(b)

(c)

(d)

(a)
Input>G0→Output=Input
|Input|<G0→Output=0
Input<−G0→Output=Input (b)
Input>G0→Output=Input−G0
|Input|<G0→Output=0
Input<−G0→Output=Input+G0

OCCUPANT PROTECTION DEVICE

TECHNICAL FIELD

This invention relates to an occupant protection device particularly preferable for use in controlling deployment of an air bag installed in a vehicle.

BACKGROUND ART

An air bag device that protects an occupant of a vehicle by deploying an air bag at the time of collision of the vehicle, for example, is known to be an example of an occupant protection device. When an impact applied to a vehicle is measured by G sensors disposed at each section of the vehicle, the air bag device converts the measured values obtained as a result thereof into digital signals and transmits those signals to an air bag electronic control unit (ECU); thus, the air bag ECU determines the presence or absence of a collision based on the received impact acceleration and controls actuation of front air bags and side air bag on the basis of that determination.

Consequently, it is important to distinguish between vibration components and collision components in terms of determining the need to actuate an air bag installed in a vehicle. For example, among components of a frontal collision, it is not necessary to actuate an occupant protection device in response to vibration components generated when traveling over rough roads, while among components of a side collision, since vibration components not requiring actuation of the occupant protection device may be generated when a vehicle door is shut with an excessive force, it is desirable to eliminate these components by an arithmetic operation. Similarly, with respect to rollovers as well, since an unnecessary angular velocity component is also generated when traveling over rough roads, it is necessary to distinguish between vibration components and collision components attributable to a rollover. Thus, it is necessary that activation of the occupant protection device be determined rapidly within several tens of milliseconds from the start of a collision but without causing an erroneous operation in response to unnecessary components.

In order to satisfy the above requirements, the following method has been conventionally employed: when G sensors are installed in a vehicle, acceleration components detected by the G sensors are integrated, and the occupant protection device is activated in the case the integral value exceeds a fixed value. In addition, a system has also been proposed that activates an occupant protection device by assessing a collision using multiple infinite impulse response (IIR) type linear filters (see, for example, Patent Document 1).

Patent Document 1: JP-A-04-146847

According to the conventional technology as described above, in the case of providing a low pass filter (LPF) for removing high-frequency components, it is necessary to lower the cutoff frequency of the LPF or set a higher order in order to attenuate vibration components. On the other hand, in order to prevent collision components from being delayed, it is necessary to raise the cutoff frequency of the LPF or set a lower order. Thus, there is a need to satisfy the aforementioned offsetting parameters.

In addition, according to the technology disclosed in Patent Document 1, although it is possible to shorten the time required for determination according to the assessment method used to carry out integration, and thus control air bag deployment at the proper timing, in the case vibration components and collision components are at the same input level, there is no difference in output values, thus making it difficult to accurately distinguish between vibration components and collision components.

DISCLOSURE OF THE INVENTION

In order to solve the above-mentioned problems, an object of this invention is to provide an occupant protection device that attenuates vibration components by controlling a delay time for collision components, thereby making it possible to accurately actuate an airbag and the like installed in a vehicle at the proper timing.

In order to solve the above-mentioned problems, the occupant protection device of this invention is provided with an input signal acquisition unit for acquiring acceleration signals or angular velocity signals from sensors installed in a vehicle, a digital signal processing unit for generating an output signal in a time series of the acceleration signals or angular velocity signals composed of consecutive first, second and third intervals by changing a multiplication factor in the second interval in comparison with the first and third intervals, and a status determination unit for determining a collision or rollover of the vehicle based on the output signal.

According to this invention, an occupant protection device can be obtained which, together with attenuating vibration components by controlling a delay time for collision components, is able to accurately actuate an air bag installed in a vehicle at the proper timing.

BEST MODE FOR CARRYING OUT THE INVENTION

The following provides an explanation of best modes for carrying out the invention with reference to the appended drawings in order to provide a more detailed explanation of the invention.

Embodiment 1

Figure 1:
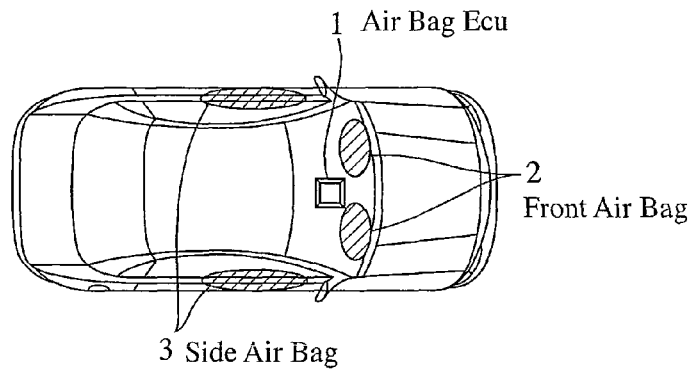
FIG. 1 is a drawing showing an example of an air bag system installed in a vehicle.

FIG. 1 is a drawing showing an example of an air bag system installed in a vehicle. As shown in FIG. 1, an air bag system for protecting occupants of a vehicle in the case of frontal collision, side collision or rollover is composed of an air bag control unit 1 (to be referred to as air bag ECU 1), installed in roughly the center of the vehicle for controlling airbag deployment, and front airbags 2 and side airbags 3 for protecting occupants of the vehicle.

Actuation of the front air bags 2 and the side air bags 3 is realized by the air bag ECU 1 converting acceleration and angular velocity measured by acceleration sensors and gyro sensors installed in the vehicle to voltage signals, and calculating the magnitude of the voltage signals during a collision or rollover by computing with an internal microcomputer. In the case the calculated value has exceeded a preset threshold value, an ignition signal is output from an actuation circuit resulting in activation of the air bags.

Figure 2:
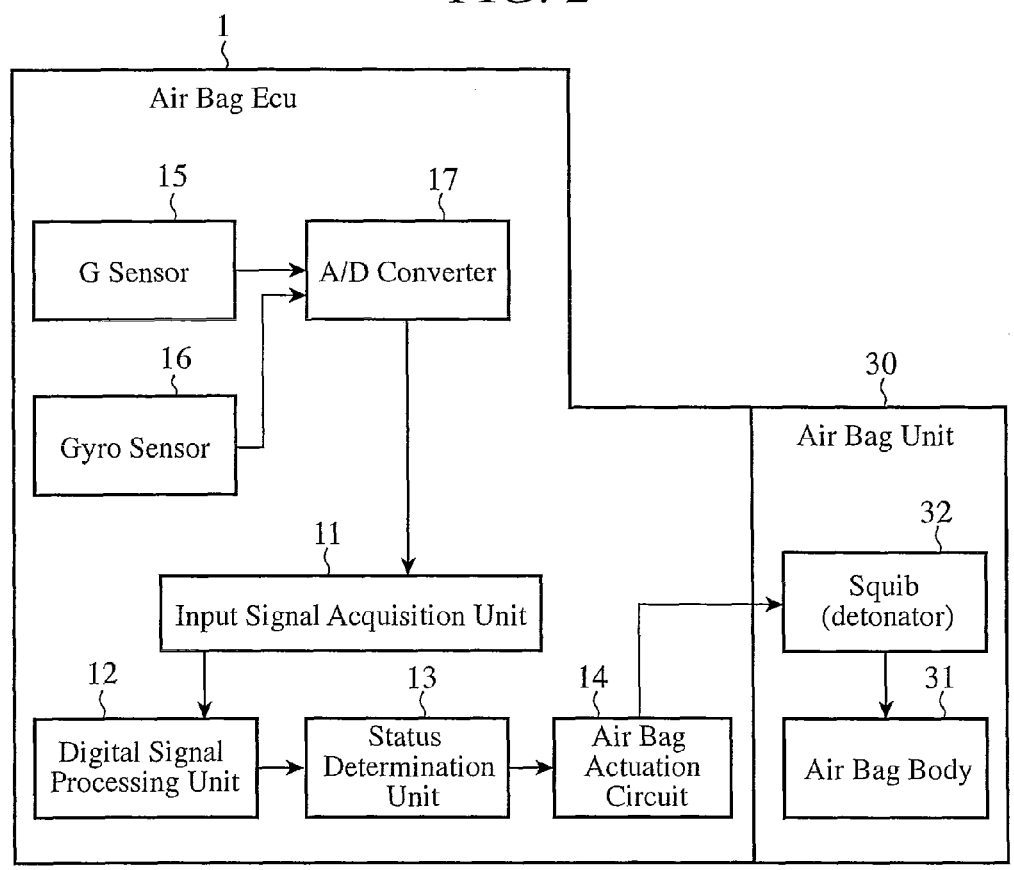
FIG. 2 is a drawing showing the configuration of the air bag system shown in FIG. 1.

FIG. 2 is a drawing showing the configuration of the air bag system shown in FIG. 1, and is composed of the air bag ECU 1 and an air bag unit 30.

The air bag ECU 1 has an input signal acquisition unit 11, a digital signal processing unit 12, a status determination unit 13, an air bag actuation circuit 14, a G sensor 15 for measuring acceleration, a gyro sensor 16, and an A/D converter 17 for converting acceleration signal components and angular velocity components measured by the G sensor 15 and gyro sensor 16, respectively, into digital signals. In addition, the air bag unit 30 has an air bag body 31 and a squib (detonator) 32.

The input signal acquisition unit 11 acquires acceleration signals or angular velocity signals from the A/D converter 17 and supplies the signals to the digital signal processing unit 12. The digital signal processing unit 12 generates an output signal in a time series of the acceleration signals or angular velocity signals composed of consecutive first, second and third intervals by changing a multiplication factor of the second interval in comparison with the first and third intervals, and supplies the output signal to the status determination unit 13. The above-mentioned intervals are described later using FIG. 4. The status determination unit 13 controls the air bag actuation circuit 14 by determining a collision or rollover of the vehicle based on the output signal generated by the digital signal processing unit 12.

Figure 3:
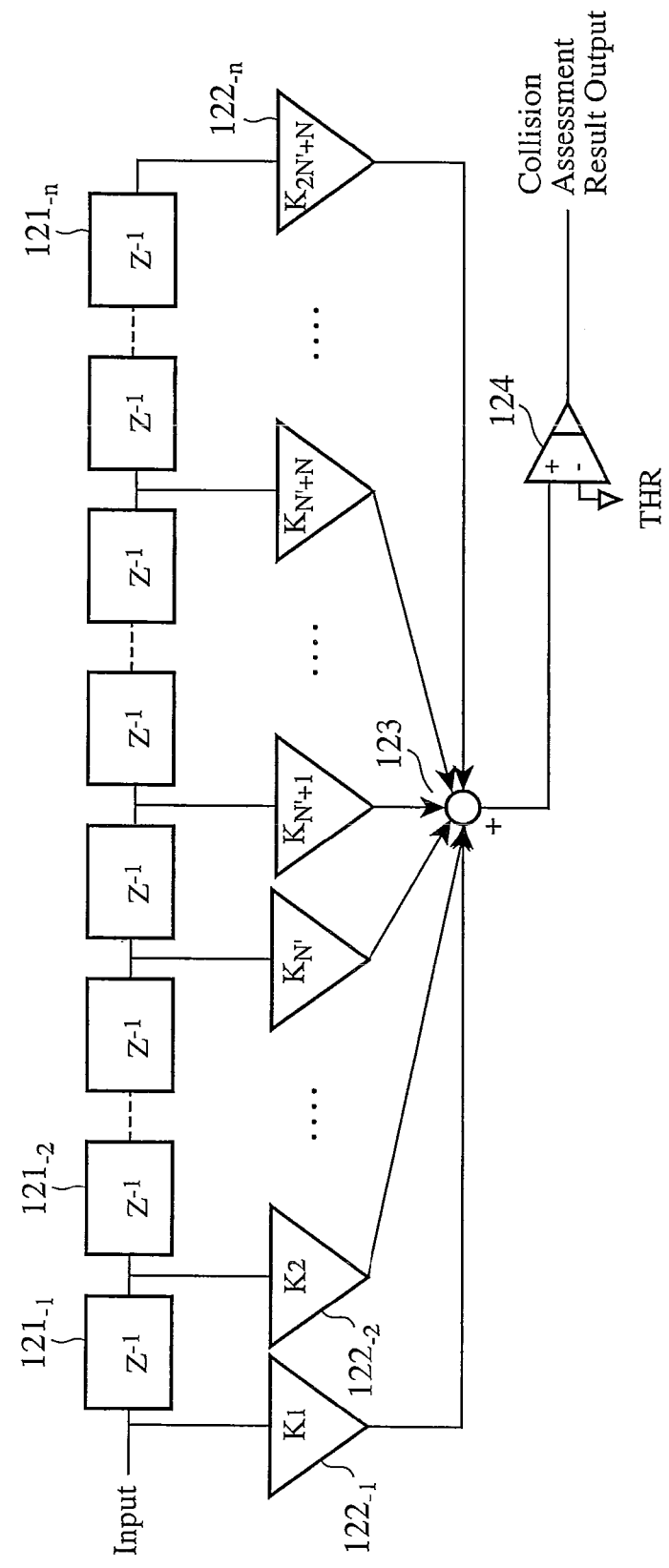
FIG. 3 is a block diagram showing the internal configuration of a digital signal processing unit 12 in accordance with Embodiment 1 of the invention.

FIG. 3 is a block diagram showing the internal configuration of the digital signal processing unit 12 in Embodiment 1 of the invention. A time series of acceleration signals or angular velocity signals composed of consecutive first, second and third intervals targeted for sampling (output of the A/D converter 17) is input to a function calculator $(K_1)122_{-1}$ and a delay element $(Z^{-1})121_{-1}$. Sampled values in the form of $Z^1$ are sequentially propagated to a subsequent stage, and each function calculator $122_{-2}$ to $122_{-n}$ connected to the output of each $Z^1$ is subjected to finite impulse response (FIR) filter processing by carrying out function calculations on each propagated $Z^{-1}$ based on parameters respectively set for each $Z^{-1}$ (multiplication factors $K_1$ to $K_{2N'+N}$). In addition, the outputs of each function calculator $122_{-1}$ to $122_{-n}$ are added by an adder 123 and supplied to the status determination unit 13 in the form of a comparator 124. The comparator 124 determines a collision based on whether or not a value processed with the FIR filter exceeds a threshold value (THR) for an input value in the form of the output of the adder 123, and in the case the output of the adder 123 has exceeded the THR, an activation signal is output for deploying the air bag unit 30.

Figure 4:
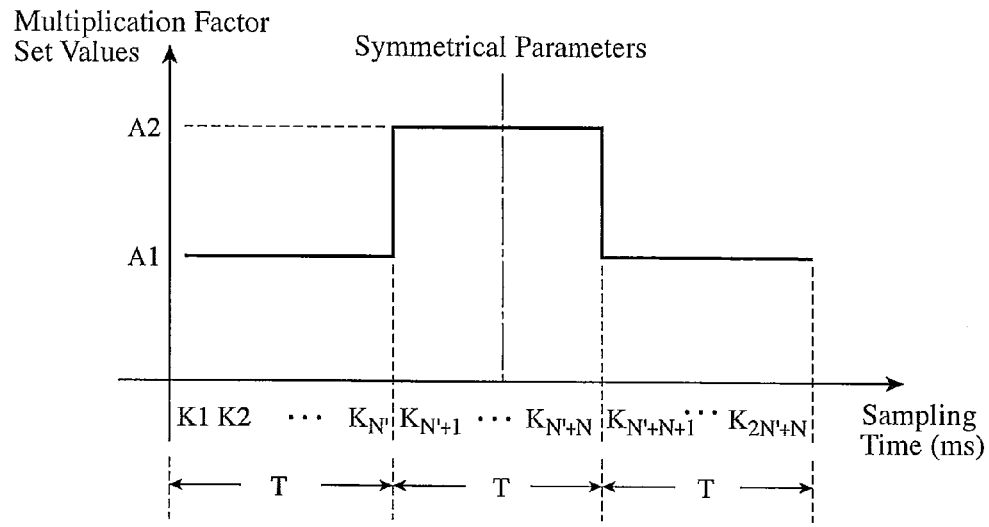
FIG. 4 is a drawing for explaining the parameter configuration of an FIR filter set for each function calculator shown in FIG. 3.

FIG. 4 is a drawing for explaining the parameter configuration of the FIR filter set for each function calculator $122_{-1}$ to $122_{-n}$ shown in FIG. 3. Sampling time (ms) is plotted on the horizontal axis while the multiplication factors set for each function calculator $122_{-1}$ to $122_{-n}$ are plotted on the vertical axis. Here, the interval from sampling time 0 to T (function calculators $K_1$ to $K_{N'}$) is designated as the first interval, the interval from sampling time T to 2T (function calculators $K_{N'1}$ to $K_{N'+N}$) is designated as the second interval, and the interval from sampling time 2T to 3T (function calculators $K_{N'+N+1}$ to $K_{2N'+N}$) is designated as the third interval.

As is clear from FIG. 4, the digital signal processing unit 12 is composed with an FIR filter in which multiplication factors in the first and third intervals are symmetrical with respect to the center of the second interval. Namely, set values in the first and third intervals are designated as A1, a set value in the second interval is designated as set value A2 that is greater than the set values in the first and third intervals, and the ratio (weighted) of the set values of the multiplication factors in the first, second and third intervals is 1:2:1. The reason for this will be described later. Furthermore, optimum values for the above-mentioned parameters are written in memory (data table) built in the air bag ECU 1.

Figure 5:
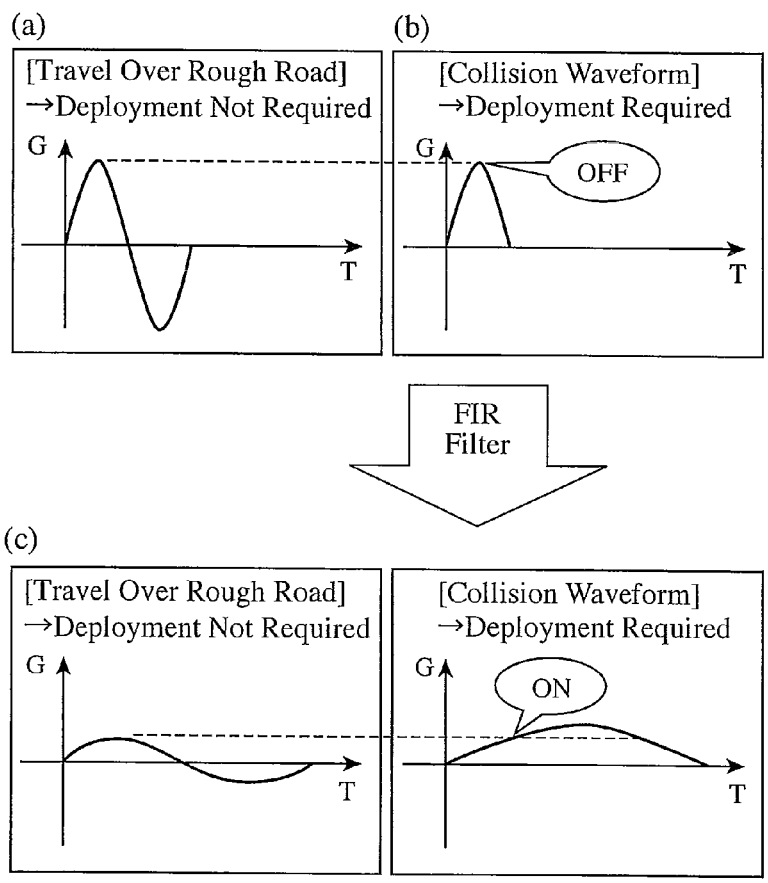
FIG. 5 shows drawings for explaining operation of a digital signal processing unit in accordance with Embodiment 1 of the invention.
Figure 6:
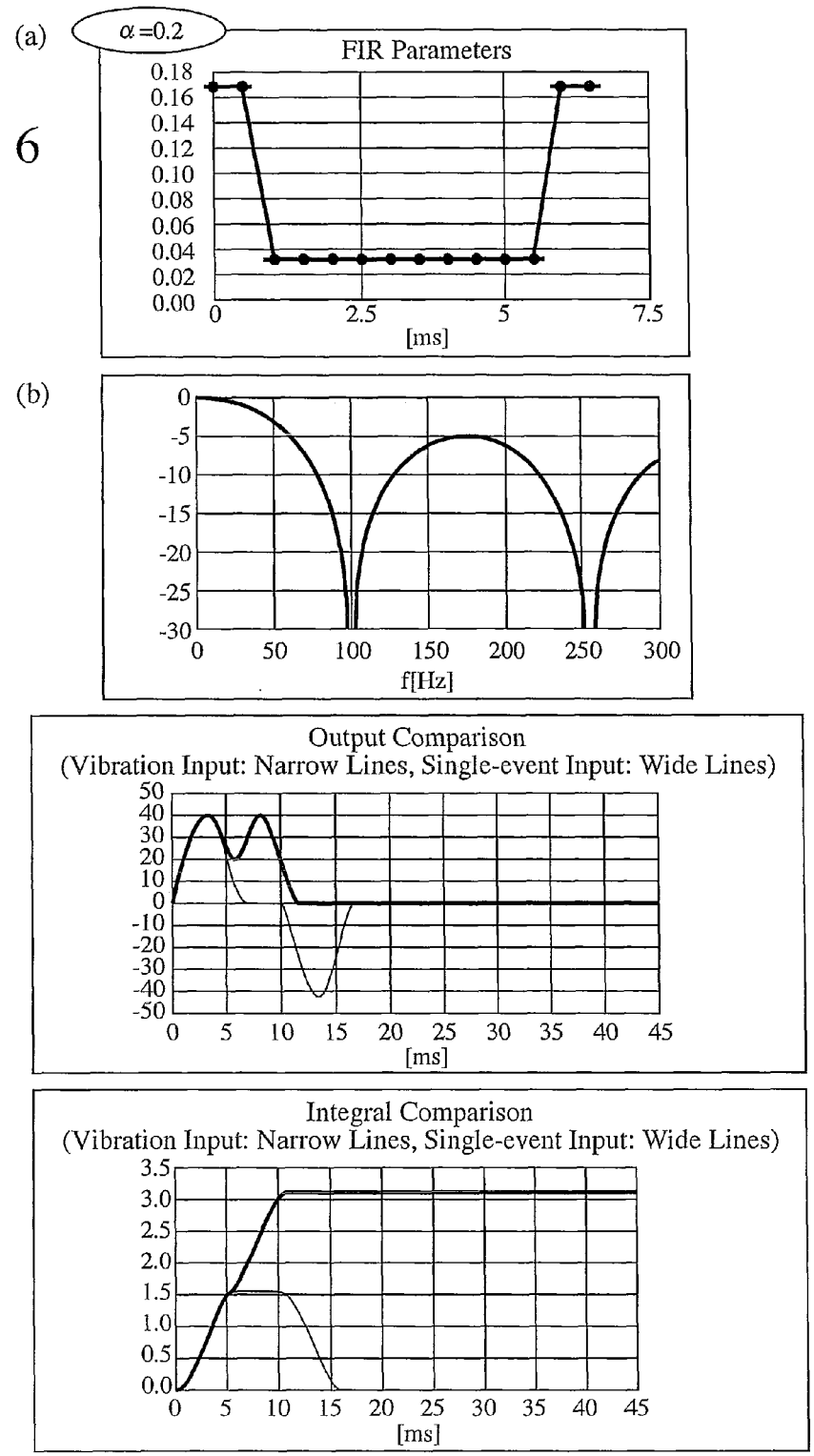
FIG. 6 shows drawings for explaining output characteristics for each parameter set in a digital signal processing unit in accordance with Embodiment 1 of the invention.
Figure 7:
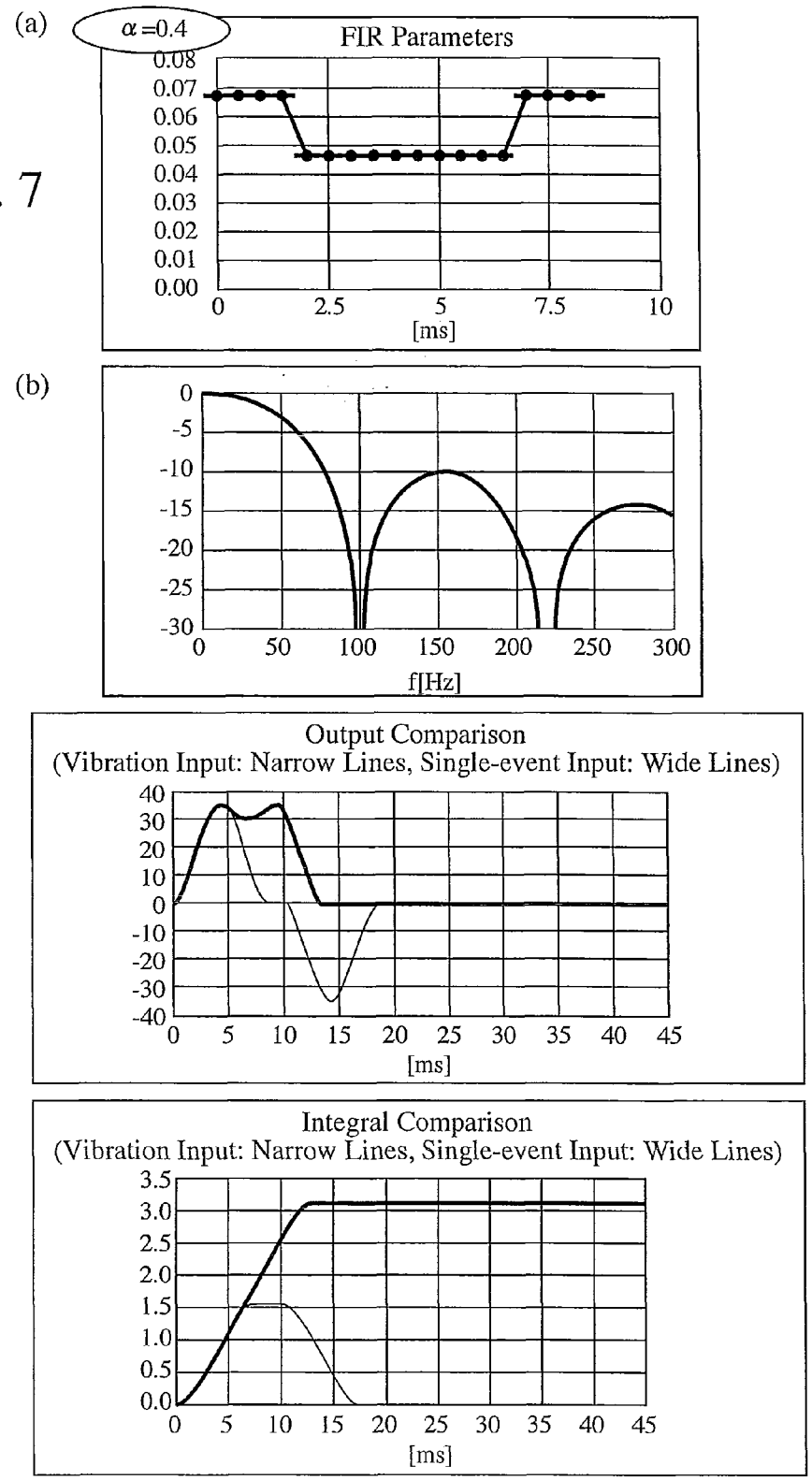
FIG. 7 shows drawings for explaining output characteristics for each parameter set in a digital signal processing unit in accordance with Embodiment 1 of the invention.
Figure 8:
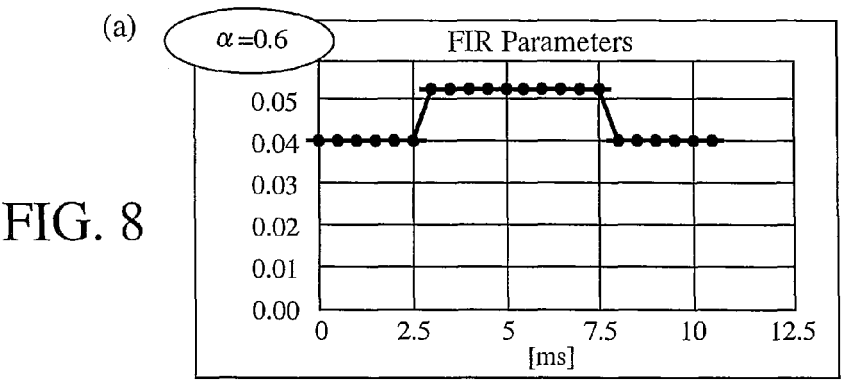
FIG. 8 shows drawings for explaining output characteristics for each parameter set in a digital signal processing unit in accordance with Embodiment 1 of the invention.
Figure 8:
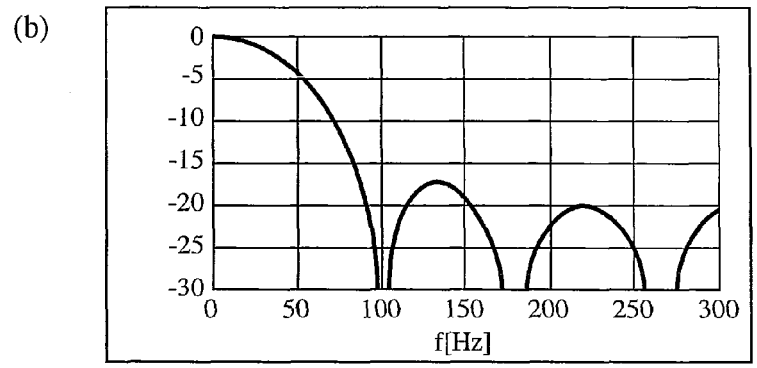
Figure 8:
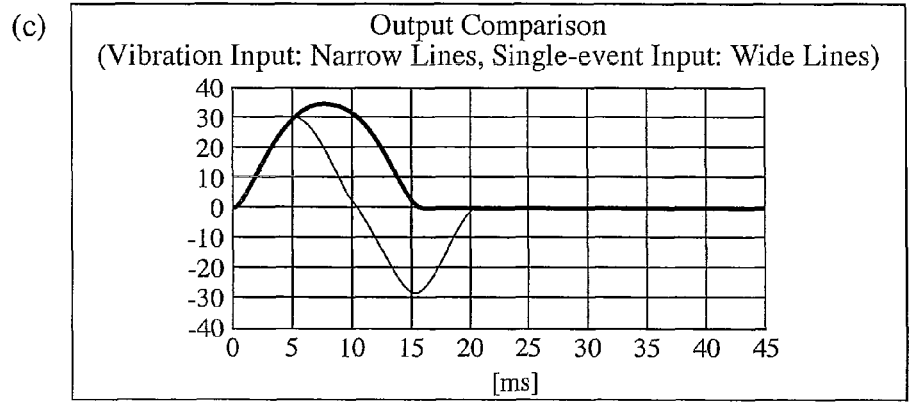
Figure 8:
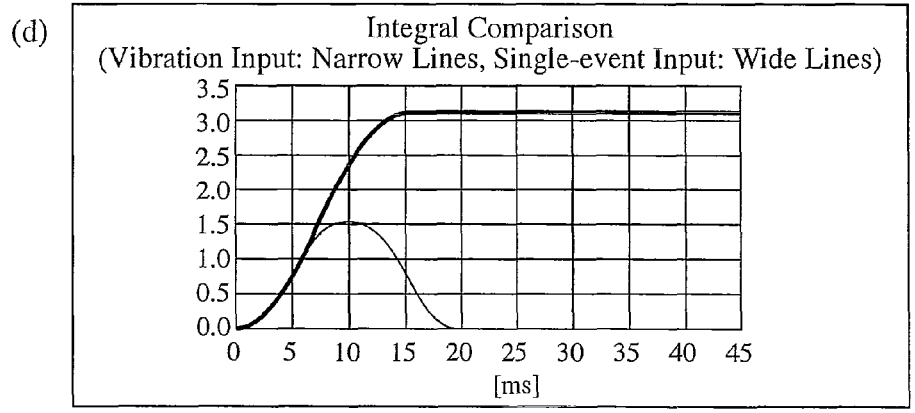
Figure 9:
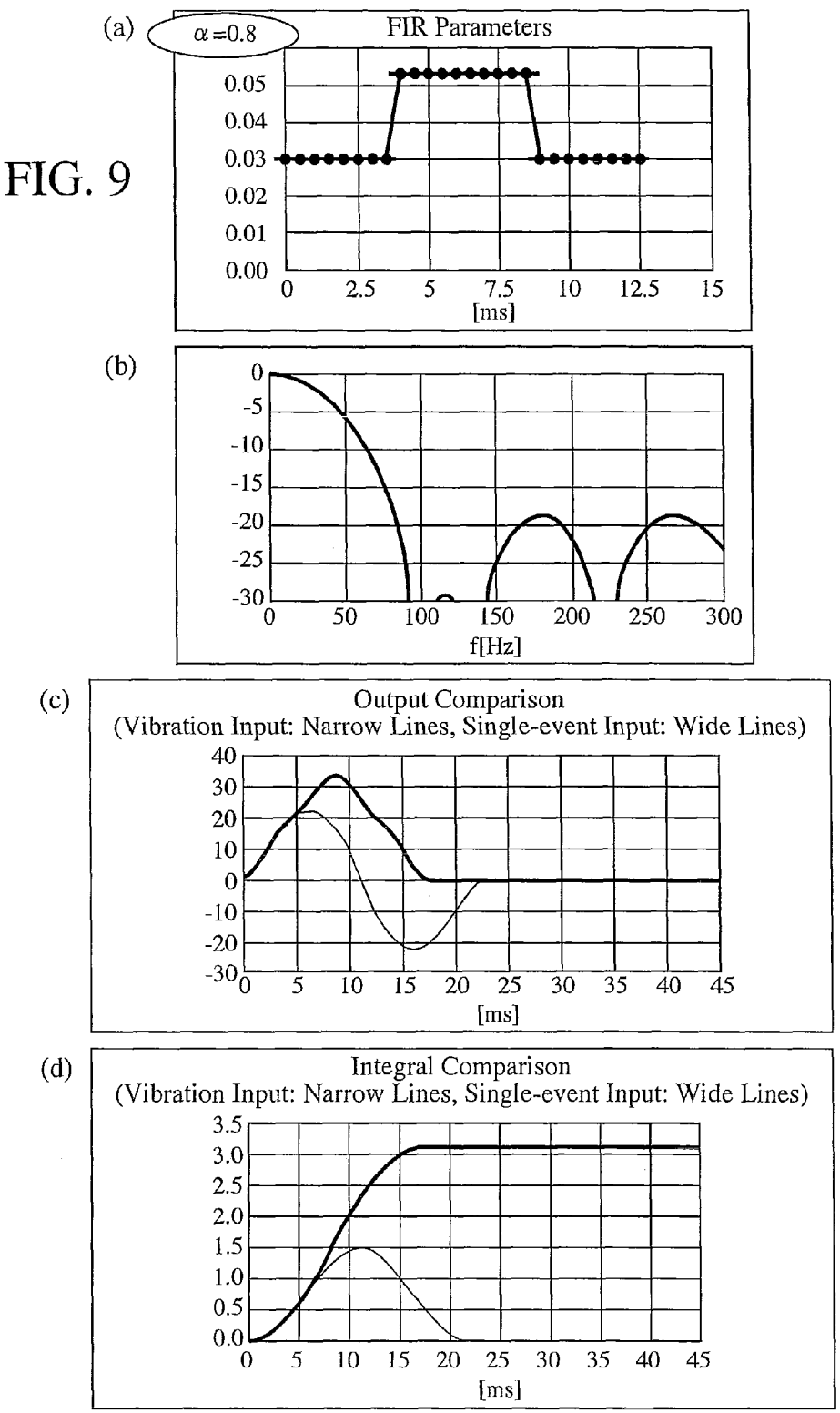
FIG. 9 shows drawings for explaining output characteristics for each parameter set in a digital signal processing unit in accordance with Embodiment 1 of the invention.
Figure 10:
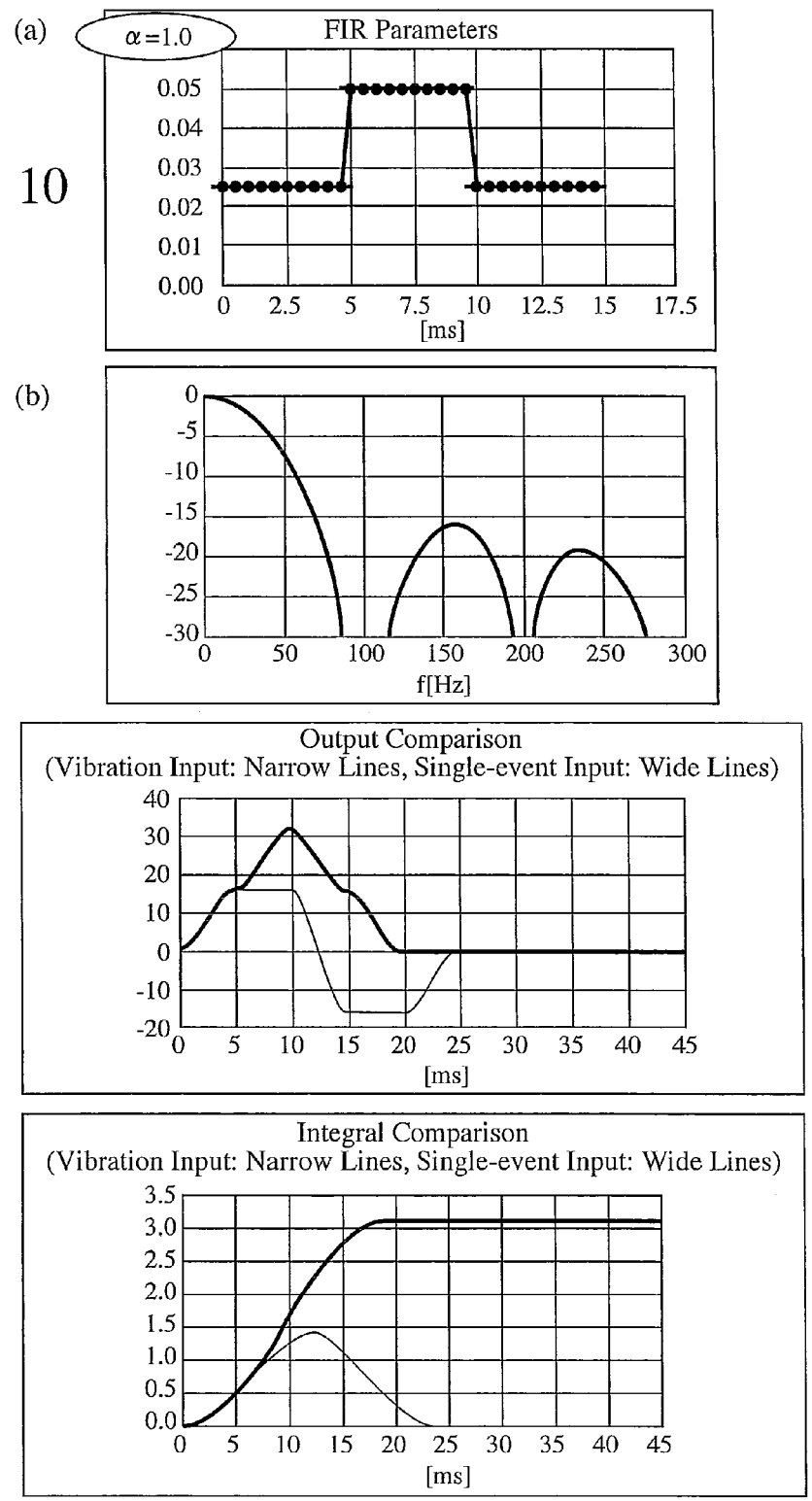
FIG. 10 shows drawings for explaining output characteristics for each parameter set in a digital signal processing unit in accordance with Embodiment 1 of the invention.

FIG. 5 shows drawings for explaining the operation of the digital signal processing unit in accordance with Embodiment 1 of the invention. More specifically, these drawings show output examples in the case of the multiplication factors shown in FIG. 4 passing through the set FIR filter with respect to a vibration component and a collision component having the same input level.

FIG. 5(a) shows a vibration component when traveling over a rough road, FIG. 5(b) shows a collision component during a single-event input, and FIG. 5(c) shows output characteristics of the FIR filter. In all of the graphs, time is plotted on the horizontal axis while G is plotted on the vertical axis. Even in the case the input levels of the vibration component and the collision component are the same, a comparative size relationship results for the output values as indicated in the output characteristics of FIG. 5(c), and control can be carried out such that an air bag deployment signal is not output since the vibration component is below the threshold value (THR) indicated with a broken line, while an air bag deployment signal is output from the FIR filter since only the collision component exceeds the THR.

FIGS. 6 to 10 are drawings for explaining output characteristics for each parameter set in the digital signal processing unit 12 (FIR filter) in accordance with Embodiment 1 of the invention. Here, N is constant while N' is varied ($\alpha$=N'/N), and output characteristics are simulated in the case of using a value for $\alpha$ of 0.2 (FIG. 6), 0.4 (FIG. 7), 0.6 (FIG. 8), 0.8 (FIG. 9) or 1.0 (FIG. 10), respectively.

In all of FIGS. 6 to 10, (a) indicates the parameter, (b) indicates gain characteristics for cutting off the frequency component when presuming the case of input of a vibration component of 100 Hz when traveling over a rough road, (c) indicates a comparison of the outputs of the vibration component and a collision component, and (d) indicates the integral comparison. In addition, narrow lines in (c) and (d) indicate the vibration component while wide lines indicate the collision component.

In the case in which the set values of the multiplication factors of the first and third intervals are smaller than the set value of the second interval ($\alpha=0.6$ to 1.0) as is clear from a comparison of FIGS. 6(a) and 7(a) with FIGS. 8(a) to 10(a), a difference occurs in the output values corresponding to the collision waveform and the vibration waveform as is clear from a comparison of FIGS. 6(c) and 7(c) with FIGS. 8(c) to 10(c), thereby eliminating the need for an additional calculation for distinguishing between the two, such as the integral indicated in FIGS. 8(d) to 10(d).

Optical characteristics in the case of $\alpha=1.0$ shown in FIG. 10(c) in particular are such that a nearly two-fold difference appears between the vibration component and the collision component, which in addition to facilitating differentiation, can also be understood to result in the earliest time at which the difference between the waveforms appears. The ratio (weighted) of the set values of the multiplication factors between the first interval, second interval and third interval for the input at this time are nearly 1 (0.025):2 (0.05):1 (0.025) as shown in FIG. 10(a).

According to Embodiment 1 as described above, by processing past data over a fixed period of time obtained from sensors installed in a vehicle with a filter having a parameter configuration in which the weighting of multiplication factors has been adjusted for each interval, a difference occurs in output values (or integral values) as a result of simple multiplication of factors carried out for each collision waveform and vibration waveform, thereby making it possible to distinguish them based on the magnitude thereof. In addition, if the same number of $K_1$ to $K_{N'}$ and $K_{N'+N+1}$ to $K_{2N'+N}$ having the same values are used according to the FIR filter, the output also becomes symmetrical in the case the input waveform is positively and negatively symmetrical. Moreover, the output level can be reliably determined regardless of the order of positive and negative inputs.

In this manner, since differentiation from vibration inputs and single-event inputs is improved and distinction is possible at an early stage, vibration components generated due to traveling over rough roads, excessively forceful shutting of doors, hammering or resonance of parts during vibrations and the like can be attenuated, thereby making it possible to accurately and rapidly extract components directly related to deceleration during a collision. Thus, as a result of determining a rollover or collision of a vehicle based on deceleration based on this filter output, an air bag and the like installed in the vehicle can be accurately actuated at the proper timing.

Furthermore, as a result of setting the ratio of set values of multiplication factors between the first interval, second interval and third interval to 1:2:1 in the case of N=N', namely, $\alpha=1.0$, the following advantageous effect is obtained: vibration components can be attenuated even with respect to vibration waveforms having periodicity of that other than a sine wave.

In addition, all multiplication factors $K_1$ to $K_{2N'+N}$ have the same polarity. This is realized by making all parameters of the FIR filter positive. Although positive outputs are generated for inputs of negative components in the case of FIR filters containing negative parameters or in the case of higher order IIR filters, in cases of a small threshold value or an excessively large input G (overshooting), there is the possibility of erroneous determination, and this can be prevented by ensuring that components of reverse polarity are not output. Moreover, here the sum of multiplication factors $K_1$ to $K_{2N'+N}$ is defined as 1. Although LPF is used to retain the final integral value (DC component) of input waveforms, by setting the sum of FIR filter parameters to be 1, collision speed can be retained by removing only those unstable high-frequency components contained in integrated waveforms.

Embodiment 2

Figure 11:
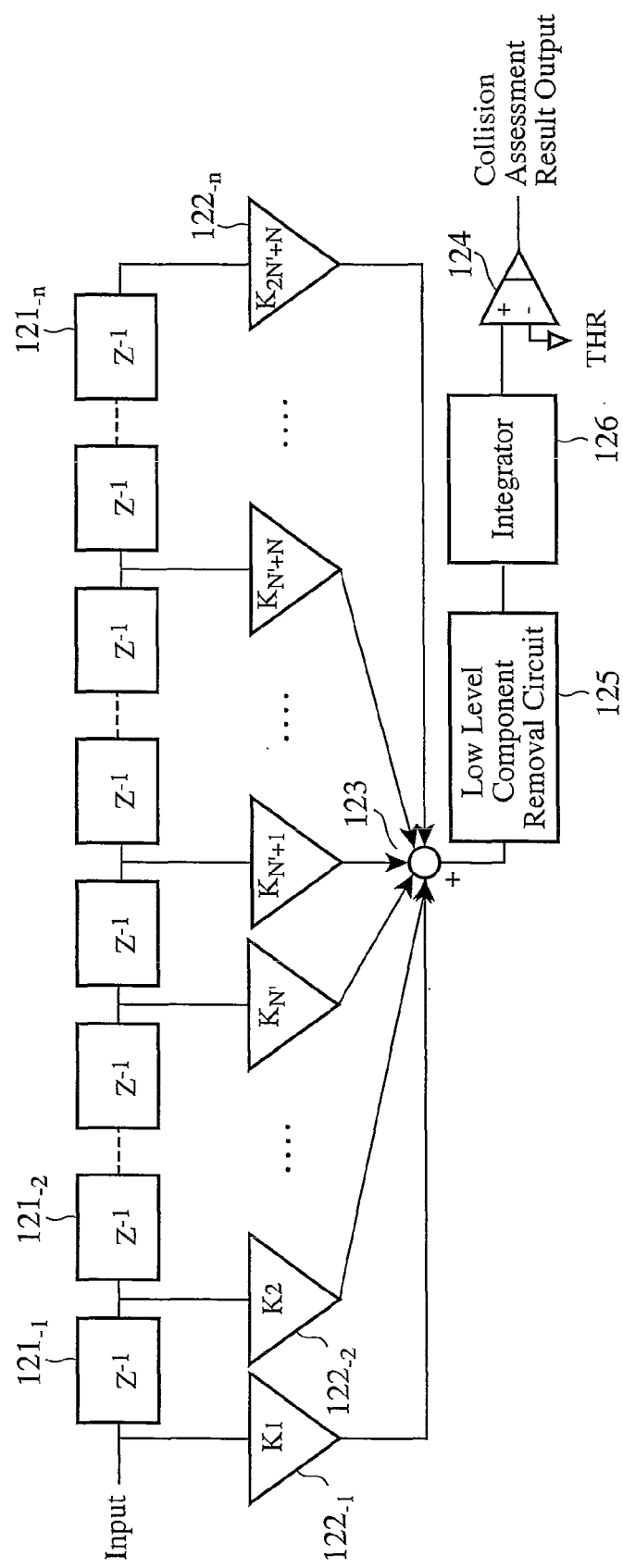
FIG. 11 is a block diagram showing the internal configuration of a digital signal processing unit in accordance with Embodiment 2 of the invention.

FIG. 11 is a block diagram showing the internal configuration of a digital signal processing unit 12 in accordance with Embodiment 2 of the invention.

The difference with Embodiment 1 shown in FIG. 3 is that a low level component removal circuit 125 and an integrator 126 have been added between the adder 123 and the comparator 124.

Namely, an integrating calculation is carried out with the integrator 126 on the output of the adder 123 in accordance with the FIR filter explained using FIG. 3, and an air bag deployment signal is output in the case an integral value determined with the comparator 124 has been judged to exceed a fixed value (THR). An accurate assessment of deployment can be made by accumulation even for cases in which assessment of air bag deployment is inadequate in the case of a single-event input only.

Figure 12:
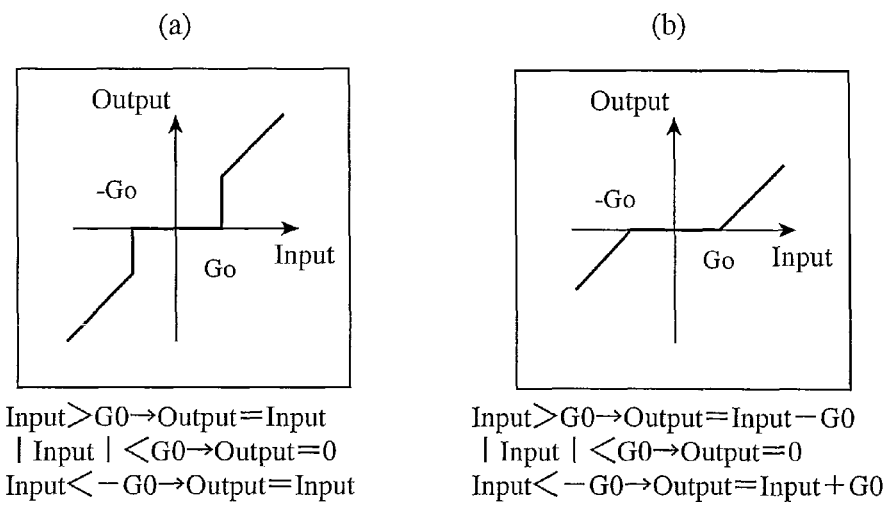
FIG. 12 shows drawings showing relational expressions for input and output of a low level component removal circuit used in Embodiment 2 of the invention.

Furthermore, the low level component removal circuit 125 outputs vibration components to the integrator 126 after removing output components contained in vibration components that have a low absolute value that have been attenuated with the FIR filter. The method used to remove low level components consists of removing components having a low absolute value using the relation expressions for input and output shown in FIG. 12.

According to FIG. 12(a), output and input are taken to be the same in the case input >G0, while in the case the absolute value of the input <G0, the output is 0, and in the case input <−G0, the output and input are taken to be the same, thereby removing low level components. In addition, according to FIG. 12(b), in the case input >G0, a value resulting from subtraction of G0 from the input is output, while in the case the absolute value of the input <G0, the output is taken to be 0, and in the case input <−G0, the output is taken to be input+G0, thereby removing low level components.

Figure 13:
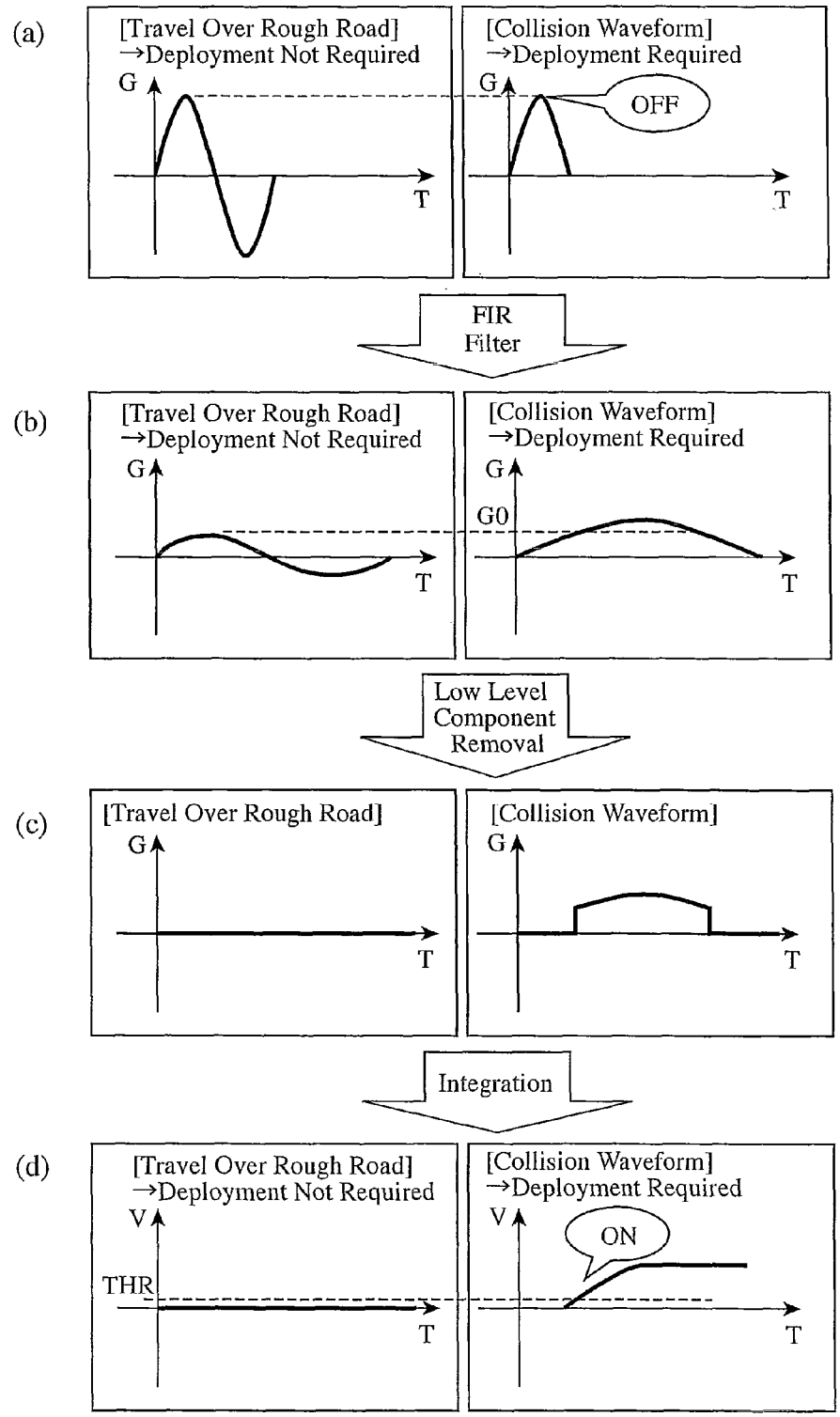
FIG. 13 shows drawings for explaining the operation of a digital signal processing unit in accordance with Embodiment 2 of the invention.

FIG. 13 shows drawings for explaining the operation of the digital signal processing unit in accordance with Embodiment 2 of the invention. More specifically, these drawings are for explaining an assessment example in the case of a vibration component and collision component having the same input level passing through the FIR filter shown in FIG. 11.

FIG. 13(a) shows a vibration component waveform not requiring air bag deployment when traveling over a rough road and a collision component waveform requiring air bag deployment. FIG. 13(b) shows a vibration component waveform and collision component waveform that have passed through the output of the adder 123 in the form of an FIR filter. FIG. 13(c) shows a vibration component waveform and a collision component waveform in which a low level component has been removed from the output of the adder 123 by the low level component removal circuit 125. FIG. 13(d) shows a vibration component waveform and a collision component waveform input to the comparator 124 through via the integrator 126. Furthermore, the dotted lines in FIG. 13 indicate the threshold (THR) level. As shown in FIG. 13(c), low level component removal is carried out on components output by the FIR filter, and as shown in FIG. 13(d), only the collision component can be seen to be integrated.

According to Embodiment 2 as described above, the magnitude of detected values after passing through the FIR filter are integrated by the integrator 126 after removing components equal to or below a fixed value, and in the case the output from the integrator 126 is equal to or greater than a prescribed value, rollover or collision is considered to have occurred and air bags are deployed. As a result, by integrating while excluding vibration components that have been attenuated, distinction between vehicle collision components and vibration components is improved. In addition, air bag deployment can be controlled by accumulating collision components for requirements in which the threshold value is not adequately reached in the case of a single-event input only.

Moreover, as a result of carrying out integration on detected values from which unnecessary low level components have been removed after passing through the FIR filter by the low level component removal circuit 125, it is possible to only extract collision components. In addition, by assessing the magnitude of extracted collision components, air bags can be activated at the appropriate timing without causing erroneous operation.

Embodiment 3

Figure 14:
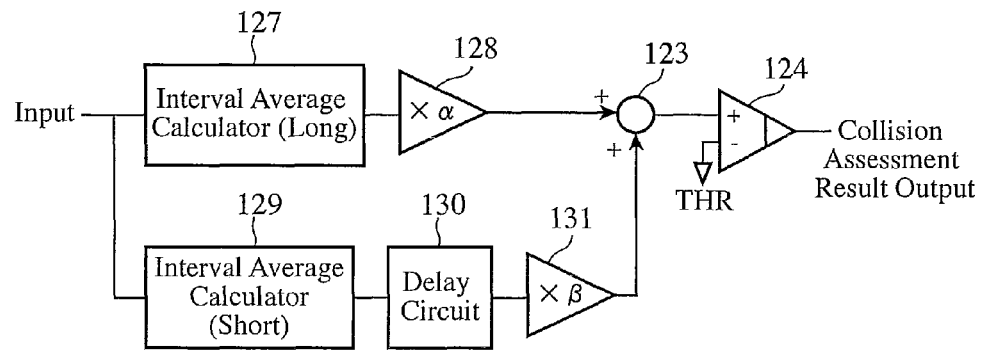
FIG. 14 is block diagram showing the internal configuration of a digital signal processing unit in accordance with Embodiment 3 of the invention.

FIG. 14 is a block diagram showing the internal configuration of a digital signal processing unit 12 in accordance with Embodiment 3 of the invention.

The digital signal processing unit 12 in accordance with Embodiment 3 of the invention is composed of a long-interval average calculator 127, a multiplier 128, a short-interval average calculator 129, a delay circuit 130, a multiplier 131 and an adder 123, and the output of the adder 123 is supplied to a comparator 124 in the same manner as Embodiment 1 shown in FIG. 3 and Embodiment 2 shown in FIG. 11. Here, this configuration carries out control of air bag deployment based on a collision assessment.

Specifically, the digital signal processing unit 12 in accordance with Embodiment 3 combines long-interval averaging and short-interval averaging processing by the long-interval average calculator 127 and the short-interval average calculator 129 for a signal from sensors 20 installed in a vehicle, and changes the weighting of the multiplication factor for the second interval in comparison with the first and third intervals. More specifically, a configuration is employed in which FIR filter processing is carried out by adding with the adder 123 the results of multiplying an output in which the short-interval average has been delayed by a prescribed amount of time by the delay circuit 130 by a factor of α with the multiplier 128, and multiplying an output of the long-interval average by a factor of β with the multiplier 131.

Here, the amount of time delayed by the delay circuit 130 is taken to be half the long-interval average. Setting a specific delay time by combining the interval integrals allows the obtaining of the same effect as the digital signal processing unit 12 shown in Embodiment 1. The output is also symmetrical in the case the input waveform is positively and negatively symmetrical. Moreover, the output level can be reliably determined regardless of the order of positive and negative inputs.

According to Embodiment 3 as described above, the same effect as the digital signal processing unit 12 indicated in Embodiment 1 is obtained by combining interval averages, and it is not necessary to have a data table required to set FIR filter parameters as required in Embodiment 1.

Embodiment 4

Figure 15:
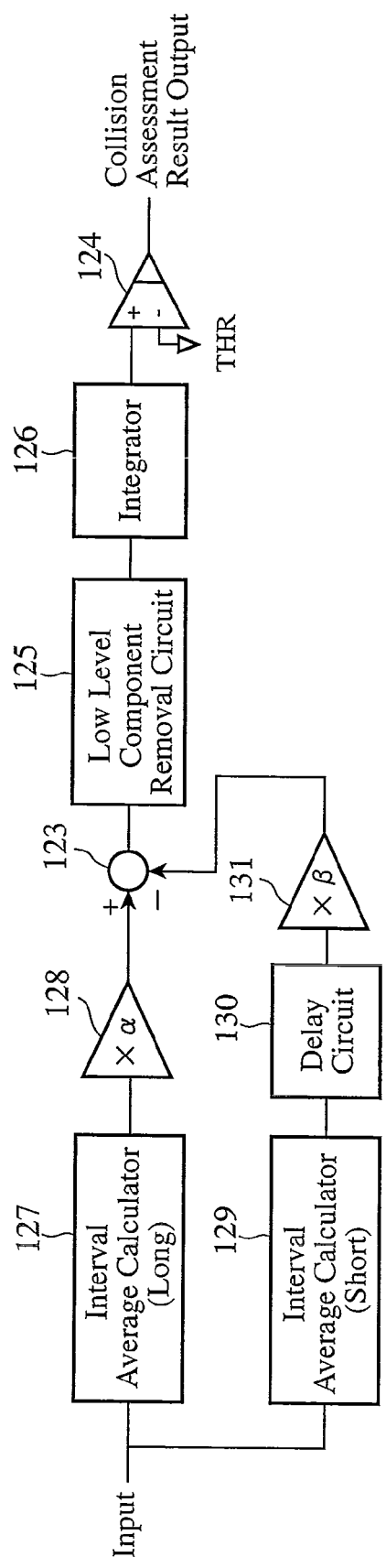
FIG. 15 is a block diagram showing the internal configuration of a digital signal processing unit in accordance with Embodiment 4 of the invention.

FIG. 15 is a block diagram showing the internal configuration of a digital signal processing unit 12 in accordance with Embodiment 4 of the invention.

The difference with Embodiment 3 shown in FIG. 14 is that a low level signal removal circuit 125 and an integrator 126 are added between the adder 123 and the comparator 124, and an output in which a short-interval average has been delayed by a prescribed amount of time by a delay circuit 130 is supplied to the low level component removal circuit 125 after subtracting from the output of the long-duration average with the adder 123. Namely, an integrating calculation is carried out with the integrator 126 on the output of the adder 123 in accordance with the FIR filter explained referring to FIG. 14, and an air bag activation signal is output in the case an integral value determined with the comparator 124 is judged to have exceeded a fixed value (THR). An accurate assessment of deployment can be made by accumulating collision components even for cases in which assessment of air bag deployment is inadequate in the case of a single-event input only.

According to Embodiment 4 as described above, as a result of employing a configuration such that an output in which a short-interval average is delayed by a prescribed amount of time is subtracted from an output of a long-interval average, and integrating an attenuated vibration component as a component not targeted for integration, distinction between vehicle collision components and vibration components is improved. In addition, air bag deployment can be controlled by accumulation of collision components even for requirements in which the threshold value is not adequately reached in the case of a single-event input only.

Moreover, as a result of carrying out integration after having removed unnecessary low output components after passing through the FIR filter with the low level component removal circuit 125, it is possible to only extract collision components. In addition, by assessing the magnitude of extracted collision components, air bags can be activated at the appropriate timing without causing an erroneous operation. Furthermore, similar to Embodiment 3 shown in FIG. 14, the same effect as the digital signal processing unit 12 indicated with Embodiment 1 is obtained by combining interval averages, and it is not necessary to have a data table required to set FIR filter parameters as required in Embodiment 1.

According to the invention as explained above, as a result of appropriately setting parameters of an FIR filter, collision, rollover and other deceleration components can be extracted while removing unnecessary vibration components, thereby enabling air bags to be deployed accurate and at the proper timing.

Furthermore, the respective functions of the input signal acquisition unit 11, the digital signal processing unit 12, the status determination unit 13 and the air bag actuation circuit 32 composing the air bag ECU 1 shown in FIG. 2 are specifically realized by a microcomputer within the air bag ECU 1 sequentially reading and executing a program recorded in internal memory. In addition, the functions of each of the constituent blocks possessed by the above-mentioned air bag ECU 1 may all be realized with software as described above, or at least a portion thereof may be realized with hardware. For example, processing in the digital signal processing unit 12 and the status determination unit 13 may be realized in a computer by one or a plurality of programs, or at least a portion thereof may be realized with hardware.

INDUSTRIAL APPLICABILITY

As has been described above, since the occupant protection device in accordance with the invention is able to accurately actuate an air bag and the like installed in a vehicle at the proper timing as a result of attenuating vibration components by controlling a delay time with respect to collision components, it is suitable for use in an occupant protection device and the like used to actuate air bags and the like installed in a vehicle.

The invention claimed is:

1. An occupant protection device, comprising:
   an input signal acquisition unit for acquiring acceleration signals or angular velocity signals from sensors installed in a vehicle;
   a digital signal processing unit for generating an output signal in a time series of the acceleration signals or angular velocity signals composed of consecutive first, second and third intervals including a plurality of points by changing a multiplication factor of the second interval in comparison with the first and third intervals with respect to a vibration component and a collision component and by attenuating the vibration component by controlling a delay time for the collision component; and
   a status determination unit for determining a collision or rollover of the vehicle based on the output signal.

2. The occupant protection device according to claim 1, wherein the digital signal processing unit is composed of an FIR filter in which multiplication factors in the first and third intervals are symmetrical with respect to the second interval.

3. The occupant protection device according to claim 2, wherein the digital signal processing unit sets the multiplication factor in the second interval to a value greater than the multiplication factors in the first and third intervals.

4. The occupant protection device according to claim 3, wherein the digital signal processing unit sets such that the set values of the multiplication factors from the first interval to the third interval are in a ratio of 1:2:1.

5. The occupant protection device according to claim 2, wherein the digital signal processing unit sets the sum of the multiplication factors from the first interval to the third interval to 1.

6. The occupant protection device according to claim 1, wherein the status determination unit determines a collision or rollover of the vehicle in a case the digital signal processing unit integrates an output signal generated by setting the multiplication factor in the second interval to a value smaller than the multiplication factors in the first and third intervals, and an output signal obtained by the integration is equal to or greater than a prescribed value.

7. The occupant protection device according to claim 6, wherein the status determination unit carries out integration by removing components in which the amplitude of an output signal generated by the digital signal processing unit is equal to or less than a prescribed value.

8. The occupant protection device according to claim 1, wherein the digital signal processing unit sets all multiplication factors from the first interval to the third interval to a same polarity.

9. The occupant protection device according to claim 1, wherein the digital signal processing unit carries out averaging processing on a plurality of intervals of the acceleration signals or angular velocity signals, combines the results of the interval averaging processing, and generates an output signal by changing the multiplication factor of the second interval in comparison with the first and third intervals.

10. The occupant protection device according to claim 9, wherein the digital signal processing unit generates an output signal by adding an output in which a comparatively short-interval average is delayed by a prescribed amount of time, and an output of a long-interval average relative to the comparatively short-interval average.

11. The occupant protection device according to claim 10, wherein the digital signal processing unit processes such that the delay time is set to half the long-interval average.

12. The occupant protection device according to claim 1, wherein the digital signal processing unit generates an output signal by adding an output in which a comparatively short-interval average is delayed by a prescribed amount of time, and an output of a long-interval average relative to the comparatively short-interval average.

13. An occupant protection device, comprising:
   an input signal acquisition unit for acquiring acceleration signals or angular velocity signals from sensors installed in a vehicle;
   a digital signal processing unit for generating an output signal in a time series of the acceleration signals or angular velocity signals composed of consecutive first, second and third intervals including a plurality of points by changing a multiplication factor of the second interval in comparison with the first and third intervals; and
   a status determination unit for determining a collision or rollover of the vehicle based on the output signal,
   wherein the digital signal processing unit carries out averaging processing on a plurality of intervals of the acceleration signals or angular velocity signals, combines the results of the interval averaging processing, and generates an output signal by changing the multiplication factor of the second interval in comparison with the first and third intervals, and
   wherein the digital signal processing unit generates an output signal by adding an output in which a comparatively short-interval average is delayed by a prescribed amount of time, and an output of a long-interval average relative to the comparatively short-interval average,
   wherein the status determination unit determines a collision or rollover of the vehicle in the case the digital signal processing unit integrates an output signal generated by subtracting an output in which a short-interval average is delayed by a prescribed amount of time from an output of a long-interval average, and an output signal obtained by the integration is equal to or greater than a prescribed value.

14. An occupant protection device, comprising:
   an input signal acquisition unit for acquiring acceleration signals or angular velocity signals from sensors installed in a vehicle;
   a digital signal processing unit for generating an output signal in a time series of the acceleration signals or angular velocity signals composed of consecutive first, second and third intervals including a plurality of points by changing a multiplication factor of the second interval in comparison with the first and third intervals; and
   a status determination unit for determining a collision or rollover of the vehicle based on the output signal,
   wherein the status determination unit determines a collision or rollover of the vehicle in a case the digital signal processing unit integrates an output signal generated by subtracting an output in which a short-interval average is delayed by a prescribed amount of time from an output of a long-interval average, and an output signal obtained by the integration is equal to or greater than a prescribed value.

15. The occupant protection device according to claim 14, wherein the digital signal processing unit sets all multiplication factors from the first interval to the third interval to a same polarity.

16. The occupant protection device according to claim 14, wherein the status determination unit carries out integration by removing components in which the amplitude of the output signal generated by the digital signal processing unit is equal to or less than a prescribed value.

17. The occupant protection device according to claim 14, wherein the digital signal processing unit is composed of an FIR filter in which multiplication factors in the first and third intervals are symmetrical with respect to the second interval.

18. The occupant protection device according to claim 17, wherein the digital signal processing unit sets the sum of the multiplication factors from the first interval to the third interval to 1.

19. The occupant protection device according to claim 17, wherein the digital signal processing unit sets the multiplication factor in the second interval to a value greater than the multiplication factors in the first and third intervals.

20. The occupant protection device according to claim 19, wherein the digital signal processing unit sets such that the set values of the multiplication factors from the first interval to the third interval are in a ratio of 1:2:1.

* * * * *